Patented July 8, 1947

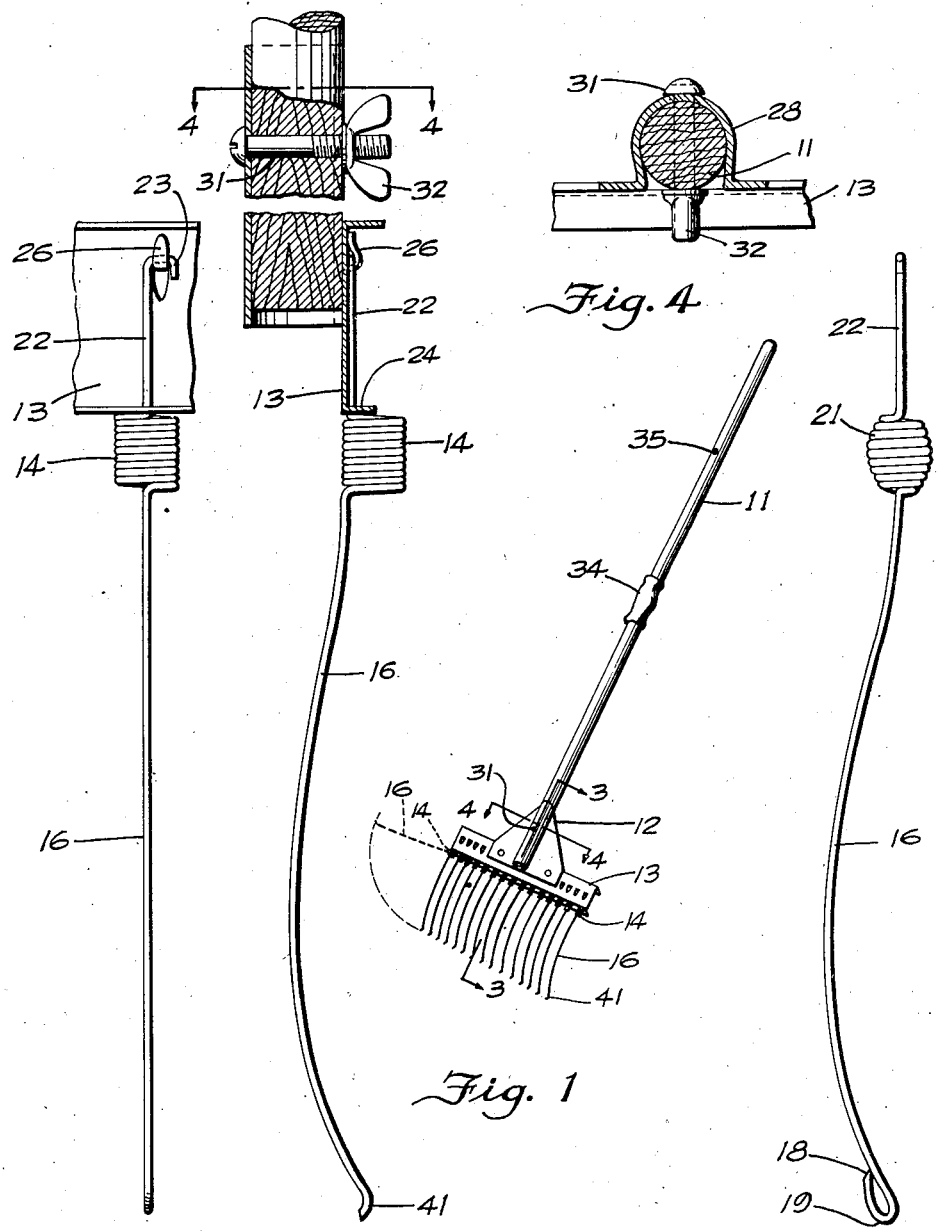

2,423,772

UNITED STATES PATENT OFFICE 2,423,772

RAKE

Harold R. Haase, River Forest, Ill.

Application July 6, 1944, Serial No. 543,644

1 Claim. (Cl. 56—400.17)

Resilient hand rakes such as the conventional broom-rakes used for raking leaves, and made out of flat bamboo, flat metal strips, or sometimes stiff wire, do not give very good service. Furthermore, if the ground is very rough, they do not do a very good job. Most of them are also very likely to pull out new grass.

The reason they do not give very good service is because the tines become bent or broken unless they are used with constant care or on unobstructed terrain. In raking close to a building, tree or bush, a jab against such a firm obstruction is likely to double back a tine. From the standpoint of cleaning leaves out of a bush, such a rake is usually virtually useless since it can't be pushed into the bush without ruining the rake, the bush, or both.

According to the present invention, a rake is provided which is virtually indestructible since the tines can be deflected 90 degrees in any direction without damage, returning immediately to their initial position. The resiliency is such that on very rough ground, all of the tines will be in contact with the ground without applying excessive pressure to the rake handle. The rake can be thrust at random into a bush near its base to pull the leaves out of the bush without damage to the rake and with little or no damage to the bush. Tines which strike a stalk of the bush can be deflected back as much as necessary to let the remaining tines penetrate into the bush.

The rake is further improved by providing it with a sliding grip on the handle and preferably also an improved handle-securing structure.

Additional objects and advantages of the invention will be apparent from the following description and from the drawings, in which Fig. 1 is a perspective view of the rake chosen for illustration;

Fig. 2 is a fragmentary view showing particularly one tine and the method of mounting the same;

Fig. 3 is a fragmentary, sectional view taken approximately along the line 3—3 of Fig. 1; and showing the side view of the tine and its mounting;

Fig. 4 is a fragmentary, sectional view taken approximately on the line 4—4 of Fig. 1 and Fig. 3;

Fig. 5 is a side view of a modified form of the tine.

Although the law requires a full and exact description of at least one form of the invention such as that which follows, it is, of course, the purpose of a patent to cover each new inventive concept therein no matter how it may be disguised by variations in form or additions of further improvements; and the appended claim is intended to accomplish this purpose by particularly pointing out the parts, improvements, or combinations in which the inventive concepts are found.

The general nature of the rake chosen for illustration is shown in Fig. 1. The handle 11 is secured to bracket 12 which in turn is welded or otherwise secured to bar 13 forming the backbone of the rake. The bar 13 has rigidly secured thereto a number of coil springs 14, the ends of which extend away to form the tines 16.

The coil springs 14 preferably have a sufficient number of turns to permit the tines 16 to be deflected at least 90 degrees without flexing the spring 14 beyond its elastic limit. This ensures quick return of the tine 16 to its initial position. The various tine and spring combinations will be made uniformly and will be uniformly applied to the backbone 13 with the result that the free ends of the tines will naturally fall in alinement. This alinement will not be altered when the tines are temporarily sprung through a 90 degree deflection and released. The disposition of the spring permits flexing equally in any direction.

Of course any weight and grade of spring wire may be used for the tines 16 and springs 14. That which is commonly used for coil tension springs in cots is believed to be suitable. Spring steel piano wire, .075" in diameter, has been found satisfactory, even without having the spring normally under tension.

It is preferred that the coil springs 14 be normally under tension. This means that an appreciable force will need to be applied to the end of a tine to initiate deflection of the spring 14, but that once enough force for this initial deflection has been reached, the force required for further deflection does not seem to build up very rapidly. In moving a heavy pile of wet leaves or trash, the rake has considerable rigidity due to the tendency of the springs 14 to stay closed. However, the springs are light enough or the tines long enough so that with only a reasonable pressure on the handle 11, the springs 14 will flex to cause the tines to conform to any ground surface. Even in the spring when the frost has badly heaved the ground in spots, the rake will easily conform to the resulting rough contour. A rake in which a force of 1⅓ lbs. applied to the end of the tine will deflect it approximately 90 degrees has been found to be satisfactory, but, of course, wide departures may be made from this value.

The end of the tine is preferably shaped so that it will not tear out new grass. The shape at present preferred is that shown in Figs. 2 and 3. However, the shape shown in Fig. 5 may be used optionally if preferred. If the shape of Fig. 5 is used, the extreme end 18 of the wire forming the loop 19 should bear firmly against the main part of the tine so that leaf fibers and the like will not slip between the end 18 and the tine in pushing leaves out of the tines. In other words, the loop 19 should be under resilient tension.

Although it is believed that the shape shown in Fig. 3 is a little more easily cleaned of leaves than the loop shown in Fig. 5, the looped shape of Fig. 5 is surprisingly easy to clean of leaves. In either case, the leaves are usually entirely cleaned off by turning the rake over and wiping it along the ground in the direction of the handle. The flat surface at the end of the wire of the tine is so small that it usually breaks right through the leaf. Of course this cleaning action could be improved still further by cutting the tine wires on a diagonal as seen in Fig. 5 so that the diagonal end face 18 of the wire 16 will slope downwardly and away from the main part of the tine which it touches. It will then be impossible for even a fibrous part of the leaf to catch on the end surface of the tine wire.

The spring shape shown at 21 in Fig. 5 may optionally be used for the spring shape shown in Figs. 2 and 3. It is neater in appearance, but a few more turns may be required to provide the same angular deflection without injury.

The tines may be secured in any suitable manner. At present, it is preferred that an extension 22 be provided at the upper end of the spring 14, the upper end of the extension 22 having a hook 23. The hook 23 can be fed through a hole in the flange 24 of backbone 13 and clamped in the position shown with a turned-out tongue cut from the backbone 13. The spring 14 will bear on the flange 24 to prevent endways movement of the tine in one direction and endways movement in the other direction will be prevented by tongue 26. Of course flange 24 and tongue 26 will cooperate to prevent all other movement of the projection 22 so that the movement of the tine will be confined to a flexing of the portion of the tine exposed beyond the flange 24, this deflection mostly occurring in the spring 14.

After the tongues 26 have been punched out and perhaps after they have been doubled back to secure the tines, the bracket 12 is welded or riveted to the backbone 13. The bracket 12 comprises a sheet metal member shaped to a simple form to provide a channel 28 for receiving the handle 11. The handle 11 may be secured in place in the channel 28 by means of a bolt 31 and thumb nut 32. Of course the handle may be made more rigid by bearing against the backbone 13 at the lower end of the handle as illustrated, and it preferably fits snugly against the sides of channel 28.

Some people find that the most efficient use of the rake involves a stroke in which the rake handle slides in the lowermost of the two hands. This is likely to wear a blister on the hand and is otherwise objectionable to some people. Accordingly, it is preferred that a sliding hand grip 34 be provided which fits fairly snugly but slides freely on the handle. Its movement may be limited in any suitable manner as by provision of a rubber headed nail 35 high enough on the handle so that the grip 24 may be slid as high as may be desired.

It has previously been proposed to provide a tine with a coil spring having its axis at right angles to the length of the tine. It is believed, however, that this would not give as satisfactory resilient qualities.

When a spring like the spring 14 is normally under tension so that the force of the spring presses the turns of the spring against one another, the friction between the turns of the spring is likely to result in variability of the angular position of the last free turn. In other words, if the last free turn is twisted in a clock-wise direction, it will spring only part-way back and if it is twisted in a counterclockwise direction, it again will spring only part-way back and be perhaps 90 degrees displaced from the position to which it first sprang back. Accordingly, it is preferred that the contact point 41 of the tine lie approximately on the axis of the spring 14 as illustrated in Figs. 2 and 3. With this arrangement, the deflection of the tine 16 about the axis of the spring will not disturb the position of the contact point 41 and hence these contact points will maintain their alinement, in spite of the friction of the tightly wound springs 14 which may sometimes prevent the complete return of the tines to their normal position angularly about the axis of the springs.

From the foregoing, it is seen that a rake has been developed which is practically indestructible from the standpoint of distorting the tines. The rake can be jabbed against firm obstructions so as to double the tines back to a 90 degree flex and they will promptly return to their original positions. The rake can be pushed into a bush, the tines that strike the stalks of the bush being deflected as much as necessary to let the remaining tines pass into the bush to pull out leaves upon removal of the rake. The contact points of the tines will conform quite readily to very rough ground. If the tines are as long as seven or eight inches, it would usually be easy to clean out the leaves from ordinary bushes in this manner. The ability of the tines to flex easily to a wide angle has the important effect in rough ground that a few of the tines can ride over a knob of ground, or even some obstruction, without raising the rake as a whole even though only ordinary pressure is being applied to the rake handle. Thus even the tines adjacent to the knob will continue to rake the ground clean.

I claim:

A rake including a wire tine, the free end of the tine being doubled back to form a loop and the loop being under resilient tension to press the end of the wire against the main part of the tine, the sides of the loop diverging from the point of contact of the end of the wire with the main portion of the tine toward the end of the tine.

HAROLD R. HAASE.

REFERENCES CITED

The following references are of record in the file of this patent:

UNITED STATES PATENTS

| Number | Name | Date |
| --- | --- | --- |
| 1,297,907 | Rand | Mar. 18, 1919 |
| 1,631,455 | Banford et al. | June 7, 1927 |
| 1,587,369 | Flowers | June 1, 1926 |
| 695,197 | Dillingham | Mar. 11, 1902 |
| 1,980,252 | Bergmann | Nov. 13, 1934 |
| 2,095,693 | Fuller | Oct. 12, 1937 |
| 2,322,132 | Hess | June 15, 1943 |
| 2,156,480 | Owen | May 2, 1939 |
| 1,989,815 | McGuire | Feb. 5, 1935 |

FOREIGN PATENTS

| Number | Country | Date |
| --- | --- | --- |
| 299,821 | Great Britain | Nov. 1, 1928 |